(12) United States Patent
Garamszegi et al.

(10) Patent No.: US 7,645,519 B2
(45) Date of Patent: Jan. 12, 2010

(54) COMPOSITE ARTICLE COMPRISING A METAL REINFORCEMENT ELEMENT EMBEDDED IN A THERMOPLASTIC POLYMER MATERIAL

(75) Inventors: László Garamszegi, Lausanne (CH); Gabrielle Milly Pax, Chavannes-Pres-Rennes (CH); Jérome Bouchet, Ecully (FR); Véronique Michaud, St.-Saphorin S/Morges (CH); Jan-Anders E. Manson, Chexbres (CH); Daniël Mauer, Bernissart (BE)

(73) Assignee: NV Bekaert SA, Zwevegem (BE)

( * ) Notice: Subject to any disclaimer, the term of this patent is extended or adjusted under 35 U.S.C. 154(b) by 486 days.

(21) Appl. No.: 10/591,917

(22) PCT Filed: Mar. 7, 2005

(86) PCT No.: PCT/EP2005/051015
§ 371 (c)(1), (2), (4) Date: Mar. 5, 2007

(87) PCT Pub. No.: WO2005/084905
PCT Pub. Date: Sep. 15, 2005

(65) Prior Publication Data
US 2007/0184288 A1  Aug. 9, 2007

(30) Foreign Application Priority Data
Mar. 9, 2004 (EP) .................. 04100938

(51) Int. Cl.
*B32B 15/04* (2006.01)

(52) U.S. Cl. ........................ 428/450; 428/391
(58) Field of Classification Search ........... 428/450, 428/391
See application file for complete search history.

(56) References Cited

U.S. PATENT DOCUMENTS 6,197,410 B1   3/2001   Vallittu et al.
6,225,404 B1   5/2001   Sorensen et al.

FOREIGN PATENT DOCUMENTS

| | | |
|---|---|---|
| EP | 1 092 749 A2 | 4/2001 |
| EP | 0 893 482 B1 | 5/2004 |
| EP | 1 241 241 B1 | 11/2005 |
| JP | 03-007743 U * | 1/1991 |
| WO | WO 00/47654 A1 | 8/2000 |
| WO | WO 00/60010 A1 | 10/2000 |

OTHER PUBLICATIONS

R. Mezzenga et al., "A review of dendritic hyperbranched polymer as modifiers in epoxy composites," Composites Science and Technology, vol. 61, Apr. 2001, pp. 787-795.

* cited by examiner

*Primary Examiner*—Kuo-Liang Peng
(74) *Attorney, Agent, or Firm*—Foley & Lardner LLP

(57) ABSTRACT

The invention relates to a composite article comprising at least one metal reinforcement element embedded in a polymer material. An adhesion promoting layer is interposed between the metal reinforcement element and the polymer material. The adhesion promoting layer comprises an organofunctional silane and a hyperbranched polymer. The invention further relates to a method of manufacturing a composite article and to the use of a composite article as metal reinforced article.

16 Claims, No Drawings

US 7,645,519 B2

COMPOSITE ARTICLE COMPRISING A METAL REINFORCEMENT ELEMENT EMBEDDED IN A THERMOPLASTIC POLYMER MATERIAL

FIELD OF THE INVENTION

The invention relates to a composite article comprising at least one metal reinforcement element embedded in a thermoplastic polymer material. The invention further relates to a method of manufacturing a composite article and to the use of such a composite article as reinforced article.

BACKGROUND OF THE INVENTION

Metal reinforced polymer materials are attractive for many applications as they combine high strength and light weight.

However, a well-known problem associated with metal reinforced polymer materials, and more particularly non polar thermoplastic polymer materials such as polyolefins, is the difficulty to obtain a good adhesion between the metal reinforcement element and the thermoplastic polymer material.

Many researchers attempted to promote the adhesion between the metal and the polymer material.

Attempts comprise for example the modification of the bulk polymer or the physico-chemical modification of one or both constituent's surfaces. Maleic anhydride is for example industrially used for increasing the functionality of the polymer in order to enhance the adhesion between steel and polymer.

Coupling agents, such as silanes, have been proposed to improve the adhesion between the metal and the polymer material.

Also epoxy and chromium based coatings are known in the art to increase the corrosion resistance and to promote adhesion between the metal surface and the polymer coatings.

However, these coatings show a number of drawbacks.

Epoxy based coatings for example absorb moisture easily. Due to the diffusion of the absorbed water into the epoxy-steel interface the interfacial adhesion strength may be weakened.

Chromium based coatings on the other hand are highly toxic so that their application is preferably avoided.

As for many applications a high corrosion resistance is desired, additional treatments are necessary.

SUMMARY OF THE INVENTION

It is an object of the present invention to avoid the drawbacks of the prior art.

It is another object of the present invention to improve the metal-polymer material bond by means of an adhesion promoting layer.

It is also an object of the invention to improve the resistance against ageing, corrosion, dynamic loads and shear forces acting across the interface.

It is a further object of the present invention to create a toughened interphase between a metal reinforcement element and a polymer matrix.

According to a first aspect of the present invention a composite article comprising at least one metal reinforcement element embedded in a polymer material is provided.

The metal reinforcement element is at least partially coated with an adhesion promoting layer. This adhesion promoting layer is interposed between the metal reinforcement element and the polymer material. The adhesion promoting layer comprises at least a first and a second component. The first component comprises an organofunctional silane and the second component comprises a hyperbranched polymer. The adhesion promoting layer may also comprise a reaction product of the first and the second component.

The second component is preferably present in a concentration lower than 20 wt %. More preferably, the concentration of the second component is lower than 15 wt %, for example 10 wt % or 5 wt %.

Organofunctional Silanes

The organofunctional silanes are compounds according to the following formula:

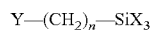

wherein

Y represents an organofunctional group selected from —$NH_2$, R—NH—, $CH_2$=CH—, $CH_2$=C($CH_3$)COO—, 2,3,epoxypropoxy, HS— and Cl—

X represents a silicon functional group selected from —OR, —OC(=O)R', —Cl wherein R and R' are independently selected from $C_1$-$C_4$ alkyls, preferably —$CH_3$ and —$C_2H_5$; and n is an integer from 0 to 20, preferably from 0 to 10 and most preferably from 0 to 3.

Preferred silanes are amino-organofunctional silanes having at least one aminofunctional group.

Hyperbranched Polymers

Hyperbranched polymers can generally be described as three-dimensional highly branched molecules having a tree-like structure. They are characterized by a great number of end groups, which can be functionalised with tailored groups to ensure compatibility and reactivity.

The end groups are for example are for example hydroxyl, thiol, amine or epoxy groups.

For the purpose of this invention the term "hyperbranched polymers" also includes dendrimers, monodisperse variations of hyperbranched polymers.

Hyperbranched polymers normally consist of an initiator or nucleus having one or more reactive sites and a number of branching layers of chain extending molecules and optionally a layer of one or more chain terminating molecules. The layers are usually called generations.

The hyperbranched polymers have preferably 1 to 5 generations.

In general, hyperbranched polymers have an average of at least 16 end groups per molecule for $2^{nd}$ generation materials, increasing by a factor of at least 2 for each successive generation.

For example, number average molar masses of 2 generation hyperbranched polymers are usually greater than about 1500 g/mol, and the molar masses increase exponentially in generation or pseudo-generation number, reaching about 8000 g/mol for a 4 pseudo-generation polymer. Typically, the molecular weight of the dendrimers will be about 100 g/mol per end group, although this will vary according to the exact formulation.

Chain termination is preferably performed by addition of at least one monomeric or polymeric chain stopper to the hyperbranched polymer. A chain stopper is preferably selected from the group consisting of aliphatic or cycloaliphatic saturated or unsaturated monofunctional carboxylic acid or anhydride having 1-24 carbon atoms; aromatic monofunctional carboxylic acid or anhydride, a diisocyanate, an oligomer or an adduct thereof, a glycidyl ester of a monofunctional carboxylic acid or anhydride having 1-24 carbon atoms; a glycidyl ether of a monofunctional alcohol with 1-24 carbon atoms, an adduct of an aliphatic or cycloaliphatic saturated or unsaturated mono-, di-, tri- or poly-functional carboxylic acid or anhydride having 1-24 carbon atoms; an adduct of an aromatic mono, di, tri or poly functional carboxylic acid or anhydride; an epoxide of an unsaturated monocarboxylic acid or corresponding triglyceride, which acid has 3-24 carbon atoms and an amino acid.

Metal Reinforcement Element

As metal reinforcement element a metal wire, metal cord, a metal strip or ribbon can be considered.

Metal wires may have any cross-section such as a circular, oval or flat (rectangular) cross-section.

The tensile strength of a metal element is preferably higher than 1500 N/mm$^2$. The range of the tensile strength is for example between 1500 and 4000 N/mm$^2$.

It may be desired to use metal cords having a structural elongation.

Also structures comprising a number of metal wires can be considered as metal reinforcement element. Examples comprise bundled, braided, welded or woven structures comprising a number of metal elements.

Any metal or metal alloy can be used to provide the metal reinforcement elements of the composite article according to the invention.

Preferably, the metals or metal alloys are selected from iron, titanium, aluminium, copper and alloys thereof.

Preferred alloys comprise high carbon or stainless steel alloys.

The metal reinforcement element or the structure comprising a number of metal elements can be coated with one or more metal or metal alloy coating before the adhesion promoting layer is applied.

Preferred metal or metal alloy coatings comprise zinc and zinc alloy coatings such as zinc-copper, zinc-aluminium, zinc-manganese, zinc-cobalt alloy, zinc-nickel alloy, zinc iron alloy or zinc-tin alloy coatings.

A preferred zinc-aluminium coating comprises a zinc coating comprising 2 to 10% Al and possibly 0.1 to 0.4% or a rare earth element such as La and/or Ce.

For some applications, it can be desired to use hybrid structures, i.e. structures combining two or more different materials such as structures comprising metal wires of two or more different metals or metal alloys or comprising metal wires in combination with non-metal filaments such as polymer filaments or glass filaments.

A first example comprises a cord having a polymer core as inner filament and metal wires, such as steel wires, as outer filaments.

Another example comprises a woven structure comprising metal filaments and polymer filaments.

Polymer Material

Any polymer can be considered as polymer material. Preferred polymers comprise thermoplastic polymers.

Examples of suitable polymers comprise polyolefins such as polyethylene or polypropylene or maleic anhydride grafted polyethylene of polypropylene; polyamides; polyurethanes; polyesters; rubbers such as polyisoprene, chloroprene, styrene-butadiene, butyl rubber, nitrile and hydrogenetated nitrile rubbers, EPDM, ABS (acrylonitrile butadiene styrene) and PVC.

According to a second aspect of the present invention, a method to manufacture a composite article is provided.

The method comprises the steps of
providing a metal reinforcement element;
applying an adhesion promoting layer on at least a part of said metal reinforcement element, said adhesion promoting layer comprising a first component and a second component, said first component comprising an organofunctional silane and said second component comprising a hyperbranched polymer;
embedding said metal reinforcement element coated with said adhesion promoting layer in a polymer material.

The adhesion promoting layer can be applied in a prehydrolized or non-hydrolized form.

The method may further comprise the step of
applying a metal or metal alloy coating before the application of said adhesion promoting layer.

According to a third aspect of the present invention, the use of a composite article as described above for all kind of applications requiring a metal reinforced polymer is provided.

A composite article according to the present invention can for example be used as strip for a hose or as cable.

DESCRIPTION OF THE PREFERRED EMBODIMENTS OF THE INVENTION

The interphase between steel and polyethylene is studied using silane as adhesion promoting layer and using an adhesion promoting layer according to the present invention.

In order to evaluate the mechanical behaviour, samples are tested by means of an in-situ uniaxial fragmentation test.

A computer controlled tensile testing machine (MiniMat 2000 from Rheometric Scientific) with a displacement control and equipped with a 1000 N load cell was used to strain the steel substrate samples up to an elongation $\epsilon$ of 4%. The clamping of the coated steel substrates was carefully optimized using sandpaper, in order to prevent sliding of the samples in the clamping jaws. The surface morphology of the coated steel substrates was then analyzed by Scanning Electron Microscopy (SEM) (Philips XL30) and compared to that of the samples before strain.

Additional in situ uniaxial fragmentation tests were carried out on 1×1 cm$^2$ samples with a computer controlled tensile testing machine (MICROTEST Materials Testing Modules, DEBEN Research), with a displacement control and equipped with a 200 N load cell. Prior to mounting the device in the SEM chamber, the clamping of the coated substrates was carefully optimized using sandpaper, in order to prevent sliding of the sample in the clamping jaws. The tensile unit was mounted in a JEOL JSM-6300F SEM, and the sample was loaded stepwise up to predefined nominal strain levels. The occurrence of damage in the coating under tension was analyzed on micrographs, with length aligned parallel to the tensile axis.

The samples comprise substrates coated with an adhesion promoting layer.

As substrates metal substrates and polymer substrates are considered. As metal substrate a steel strip having a thickness of 50 μm and a width of 6 mm is used.

The tested polymer substrates comprise polyethylene (PE) and maleic anhydride grafted polyethylene (MAH-g-PE) having a thickness between 300 and 500 μm.

The steel and polymer substrates were coated with a liquid γ-(aminopropyl)triethoxysilane (γ-APS), 99% pure or with a γ-(aminopropyl)triethoxysilane (γ-APS) modified with 10 wt % of an epoxyfunctional hyperbranched polymer (HBP).

The silane γ-APS belongs to a class of organofunctional trialkoxysilane that hydrolyse and condense forming products ranging from small oligomers to extensive cross-linked polymerized networks. The modifier (HBP) is an epoxy functionalized HBP, supplied by Perstorp, Sweden. This hyperbranched polymer has an epoxy equivalent weight of 1080 g/eq and a theoretical epoxy functionality of 11.

The γ-APS/HBP was diluted in 95 wt % of ethanol before spin coating. The substrates were coated by spin-coating using fresh and basic solution of respectively 5 wt % γ-APS and 5 wt % γ-APS+10 wt % HBP in ethanol.

Fragmentation tests on steel substrates have shown that no cracking is observed on both pure and HBP modified silane coatings up to a strain of 4%. The maximum elongation possible for the used steel substrate is 4.5%.

In-situ fragmentation tests on the chemically modified polyethylene substrates have shown that the crack onset point, i.e. the strain at which the first cracks appear, of both pure silane and HBP modified silane coatings are similar, at slightly less than 10% of strain. However, the crack propagation mechanism changes when HBP is added to the silane coating. Indeed, straight propagation of the cracks is observed in pure silane coating whereas snake-like propagation of the cracks takes place when HPB is added to the silane. It was observed that by adding HBP to the silane, a new interphase with a network comprising a phase separation between both components is created.

In situ fragmentation tests indicate that the cracks can be stopped, deviated or slowed down by the HBP nodule.

These results tend to point out that HBP's does not have an influence on the crack onset point, but show a toughening effect when added to the silane coating.

The invention claimed is:

1. A composite article comprising at least one metal reinforcement element embedded in a polymer material, said metal reinforcement element being at least partially coated with an adhesion promoting layer, said adhesion promoting layer being interposed between said metal reinforcement element and said polymer material, wherein said adhesion promoting layer comprises a first component and a second component, said first component comprising an organofunctional silane and said second component comprising a hyperbranched polymer.

2. A composite article according to claim 1, wherein said second component is present in a concentration lower than 20 wt %.

3. A composite article according to claim 1, wherein said organofunctional silane comprises an amino-organofunctional silane.

4. A composite article according to claim 1, wherein said hyperbranched polymer has 1 to 5 generations.

5. A composite article according to claim 1, wherein said hyperbranched polymer has at least one functional end group.

6. A composite article according to claim 1, wherein said hyperbranched polymer has an average of at least 16 end groups per molecule.

7. A composite article according to claim 1, wherein said hyperbranched polymer has an average of at least 32 end groups per molecule.

8. A composite article according to claim 5, wherein said at least one functional end group comprises hydroxyl, thiol, amine or epoxy groups.

9. A composite article according to claim 1, wherein said metal reinforcement element comprises an elongated metal element or a structure comprising a number of elongated metal elements.

10. A composite article according to claim 1, wherein said metal reinforcement element is coated with at least one metal or metal alloy coating before the adhesion promoting layer is applied.

11. A composite article according to claim 10, wherein said metal or metal alloy coating comprises zinc or a zinc alloy.

12. A composite article according to claim 1, wherein said polymer material comprises a thermoplastic polymer material.

13. A method of manufacturing a composite article as defined in claim 1, said method comprising the steps of:
   providing a metal reinforcement element;
   applying an adhesion promoting layer on at least a part of said metal reinforcement element, said adhesion promoting layer comprising a first component and a second component, said first component comprising an organofunctional silane and said second component comprising a hyperbranched polymer;
   embedding said metal reinforcement element coated with said adhesion promoting layer in a polymer material.

14. A method according to claim 13, further comprising the step of:
   applying a metal or metal alloy coating before the application of said adhesion promoting layer.

15. A strip for a hose comprising the composite article as defined in claim 1.

16. A cable comprising the composite article as defined in claim 1.

* * * * *

UNITED STATES PATENT AND TRADEMARK OFFICE
CERTIFICATE OF CORRECTION

PATENT NO. : 7,645,519 B2  Page 1 of 1
APPLICATION NO. : 10/591917
DATED : January 12, 2010
INVENTOR(S) : Garamszegi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 609 days.

Signed and Sealed this

Sixteenth Day of November, 2010

David J. Kappos
*Director of the United States Patent and Trademark Office*